United States Patent [19]

Crossley, Jr. et al.

[11] Patent Number: 4,672,202
[45] Date of Patent: Jun. 9, 1987

[54] ADJUSTABLE MOUNT FOR ELECTRO-OPTIC TRANSDUCERS IN AN EVACUATED CRYOGENIC SYSTEM

[75] Inventors: Edward A. Crossley, Jr., Gloucester Point; David P. Haynes, Newport News; Howard C. Jones; Irby W. Jones, both of Hampton, all of Va.

[73] Assignee: The United States of America as represented by the Administrator of the National Aeronautics and Space Administration, Washington, D.C.

[21] Appl. No.: 831,377

[22] Filed: Feb. 20, 1986

[51] Int. Cl.⁴ .............................................. G01T 1/16
[52] U.S. Cl. ................................... 250/238; 250/352; 62/514 R
[58] Field of Search ....................... 250/238, 352, 261; 220/901; 62/514 R

[56] References Cited

U.S. PATENT DOCUMENTS 3,601,611  8/1971  Kendall, Sr. ......................... 250/352
3,713,560  1/1973  Slysh et al. .......................... 220/901

Primary Examiner—David C. Nelms
Assistant Examiner—S. Allen
Attorney, Agent, or Firm—George F. Helfrich; John R. Manning

[57] ABSTRACT

The invention is an adjustable mount for positioning an electro-optic transducer in an evacuated cryogenic environment. Electro-optic transducers are used in this manner as high sensitivity detectors of gas emission lives of spectroscopic analysis. The mount is made-up of an adjusting mechanism 10 and a transducer mount 20. The adjusting mechanism provided five degrees of freedom, 3 linear adjustments and 2 angular adjustments. The mount allows the use of an internal lens 66 to focus energy on the transducer element thereby improving the efficiency of the detection device. Further, the transducer mount 20, although attached to the adjusting mechanism 10, is isolated thermally such that a cryogenic environment can be maintained at the transducer while the adjusting mechanism 10 remains at room temperature. Radiation shields 68 also are incorporated to further reduce heat flow to the transducer location.

9 Claims, 6 Drawing Figures

ADJUSTABLE MOUNT FOR ELECTRO-OPTIC TRANSDUCERS IN AN EVACUATED CRYOGENIC SYSTEM

ORIGIN OF THE INVENTION

The invention described herein was made by employees of the United States Government and may be manufactured and used by or for the Government for governmental purposes without the payment of any royalties thereon or therefor.

TECHNICAL FIELD OF THE INVENTION

The invention is related to adjustable mounts and bracket technology.

BACKGROUND OF THE INVENTION

This invention relates to adjustable mounting technology and more particularly to adjustable mechanisms which can be used in evacuated cryogenic environments.

Research measurements of trace gas species in the stratosphere for the purpose of understanding the physics and chemistry of the upper atmosphere require the use of highly sensitive instruments. Typically these instruments use sensitive electro-optical transducers for the detection and identification of tenuous atmospheric constituents by spectroscopic or other means. The extreme sensitivity of these devices generally requires that the transducer be cryogenically cooled and housed in evacuated chambers for isolation from the ambient temperature. In addition, precise alignment of elements in the detector device are required. The use of a photo detector, for example, requires an external collimated light beam to be focused on the transducer. Other examples, such as semiconductor laser elements require focusing a coherent light source through a lens into a collimated reference signal. All techniques require that the electro-optical transducer be accurately aligned and positioned with respect to a fixed focus lens which provides the interface between the transducer in the evacuated chamber and the external optical system. The transducer must be aligned linearly along a reference three-axis coordinate system with respect to the optical axis and focal point of the lens. In addition, the transducer must be aligned through two angles with respect to the reference coordinate system to assure optimum radiation exchange between the transducer and the optical system. Only two angular adjustments are incorporated; the third angle must be fixed in order to preserve the alignment of optical polarization between the transducer and the external optical system. This angular adjustment is particularly critical for optimally focusing a semiconductor laser element which may radiate field patterns which are angularly misaligned with respect to the crystal face. Atmospheric researchers using transducer detection devices need a means to provide at least five degrees of freedom, there in translation and two in rotation, in order to properly adjust the electro-optical transducer. These adjustments must be made while the transducer is sealed in an evacuated and cryogenically cooled environment.

Prior adjustable mounts have been unsuitable due to a lack of adjustment sensitivity, lack of mechanical stability which allows vibrational errors, lack of isolation from ambient temperature, and lack of dimensional stability due to thermal contraction or expansion of the mechanism.

Although fixed mountings used in prior art avoided the above problems, the lack of adjustability results in unsatisfactory operation of the detection devices. Linear adjustments in three dimensions are necessary for proper alignment of the lens location in the lateral and axial directions with respect to the external optical system and the internal transducer. Fine adjustments, on the order of 25 micro-meters are required. Since these adjustments are not provided by the prior art, the necessary alignments must be provided externally and may require a reorientation of external optical system components or may result in some basic misalignment of the system. A significant feature of the present invention is that appropriate linear adjustments can be made during system operations until the optical response is optimized.

Prior art provides a fixed-lens system without any provision for angular adjustments of the electro-optical transducer. Semiconductor lasers, however, often produce irregular far field radiation patterns wherein much of the radiated energy is concentrated off-center in one or more lobes. A fixed angle lens cannot position the higher energy lobes on the transducer.

A further difficulty with prior art fixed mounting is that a window must be used rather than a focusing lens because of the absence of internal adjustments. This configuration requires the use of an external lens to collect widely dispersed energy from the diode resulting in a loss of scattered energy and a loss of overall system efficiency. Positioning of an external lens also requires reorientation of the entire optical system to accept the variable optical axis location defined by the lens.

Another significant disadvantage of prior art, when both a window and lens are used, involves the resultant refractive attenuation of the signal caused by using two optical elements in series. With certain low power semiconductor lasers, this additional signal loss can be significant. Further, often the external alignment process is complicated by the use of window material which is opaque to visible light, making a visual alignment of the external optical elements impossible.

Accordingly, it is an object of the present invention to provide a means for precise and remote positioning of electro optical transducers which are housed in cryogenic, evacuated environments.

It is a further object of the present invention to provide a means for accurate, temperature-controlled cryogenic cooling of the adjustable mounted transducer.

It is yet another object of the present invention to provide a means of efficient thermal isolation of the mount from the adjustable base.

Still another object of the present invention is to provide a means for remote adjustment while maintaining vacuum integrity between the evacuated transducer and the ambient environment.

A further object of the present invention is to provide a means for efficient thermal shielding of the electro optical transducer which increases the efficiency of transducer cooling.

SUMMARY OF THE INVENTION

According to the present invention, the foregoing and additional objects are attained by providing an adjustable mount for electro optical transducer comprising an adjusting mechanism, a transducer mount with a heat sink, and insulating means. The adjusting mechanism includes a base plate with three parallel shafts which provide for pinion axial adjustment, pitch adjustment and pinion azimuth adjustment. Focus adjustments and lateral alignment adjustments are made by adjusting body mounted set screws to position the base plate. The transducer mount includes high efficiency, thermal isolation supports, a radiation shield and cap, a heat sink and terminal. The mount is attached directly to the top of the adjusting mechanism.

The electro optical transducer is mounted onto the heat sink which is also the center of rotation for the angular adjustments. This feature permits each of the five adjustments, three linear and two angular, to be accomplished independently. The total adjustment process can be performed in sequential steps.

BRIEF DESCRIPTION OF THE DRAWINGS

A more complete appreciation of the present invention and the many attendant advantages thereof will be readily apparent as the same becomes better understood by reference to the following descriptions when considered in connection with the accompanying drawings wherein.

DETAILED DESCRIPTION OF THE INVENTION

Figure 1:
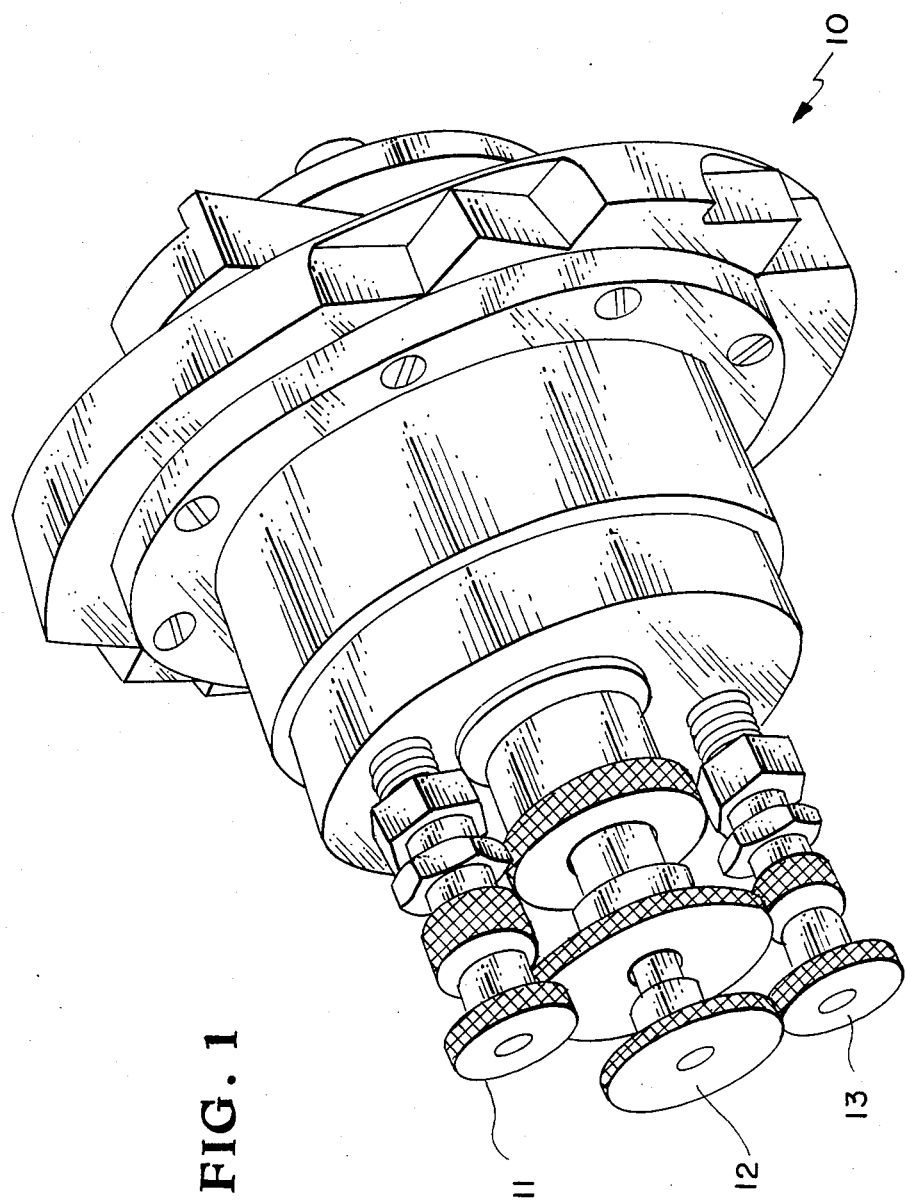
FIG. 1 is a perspective view of the five-axes adjusting mechanism of the present invention.

Referring now to the drawings wherein like elements are referred to by the same reference numeral throughout the several views and more particularly to FIG. 1, a perspective view of the adjusting mechanism designed generally by the numeral 10, shows three parallel-shaft adjustments, identified as the pinion axial shaft 11, the pitch shaft 12, and the pinion azimuth shaft 13. Two additional body-mounted lateral adjustments are not visible but may be seen on FIG. 5 as focus 51 and lateral alignment 52 adjustments. These two adjustments are body-mounted set screws which position the adjusting mechanism plate 31, depicted in FIG. 3. The complete operation of these five adjustments is described more fully below under Operation of the Invention.

Figure 2:
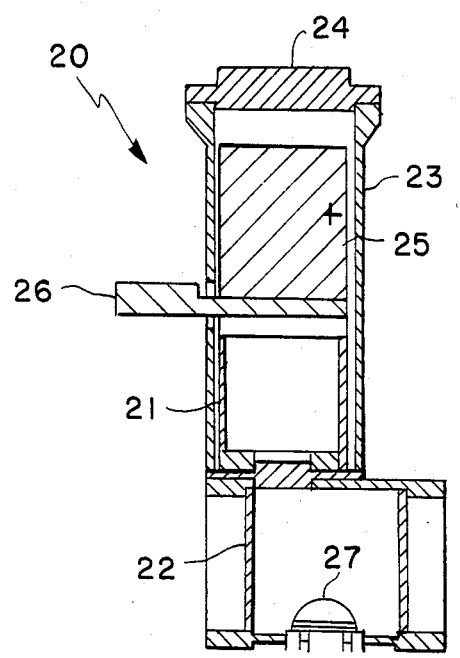
FIG. 2 is a cross-sectional side view of the transducer mount which attaches directly to the top of the five-axes adjusting mechanism.

Referring now to FIG. 2, the transducer mount 20 is depicted in cross-section. The transducer mount comprises an assembly of six main structural elements. Upper support 21 and lower support 22 are designed to provide high-efficiency thermal isolation of the transducer. Other elements of the mount include radiation shield 23 with cap 24, heat sink 25 and terminal 26. In the preferred embodiment, upper support 21 is a high-efficiency fiberglass support structure which isolates the heat sink and terminal from the radiation shield 23. Efficient thermal isolation is necessary to provide a temperature drop from about 100° K. at the base of the upper support to a temperature of 10°–20° K. at the top of the support. This permits control of the heat sink temperature to the desired accuracy. The lower support 22 is also a high-efficiency fiberglass support structure with the requirements of structural stability and thermal isolation. The structure must support the heat sink and radiation shield with negligible mechanical deflection in order to maintain the optical alignment of the system. Efficient thermal isolation is necessary to provide a temperature drop from the 300° K. ambient conditions at the base of the lower support to approximately 100° K. at the top of the support. This thermal isolation permits the adjusting mechanism to operate at room temperature and also minimizes the flow of undesirable parasitic heat into the cryogenic area of the electro-optical transducer.

Heat sink 25 is constructed of high-purity copper for thermal-conductive efficiency at cryogenic temperatures. Terminal 26 is also fabricated from high purity copper for efficient conduction from the heat sink to an attached flexible thermal strap 64 (shown in FIG. 6) which is connected to a primary source of cryogenic cooling such as a cryogenic refrigerator or dewar. The flexible thermal strap permits motion of the mount during adjustments and also isolates the mount from externally generated vibrations.

Figure 3:
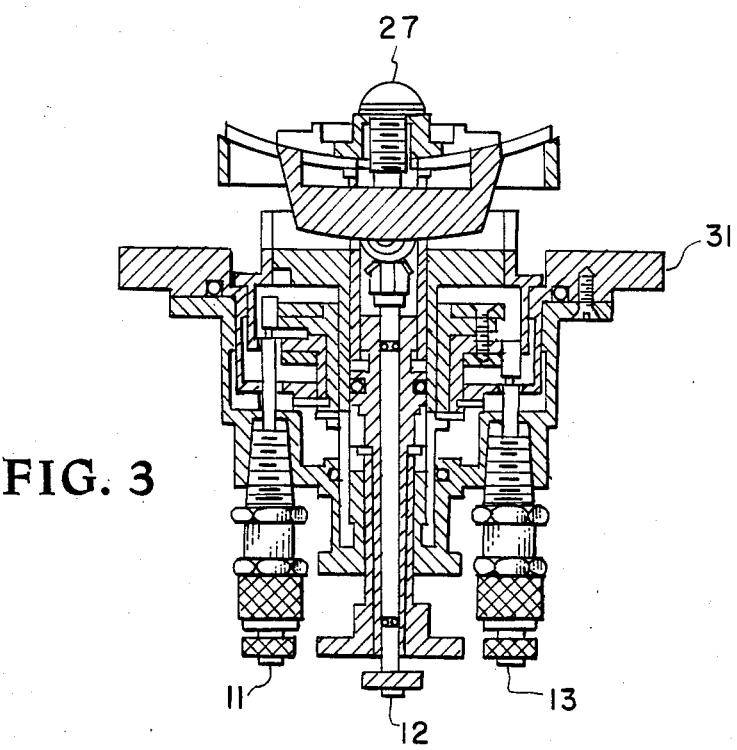
FIG. 3 is a cross-sectional view of the adjusting mechanism.

The transducer mount 20 is attached to the top of the adjusting mechanism 10 which is shown in cross-section in FIG. 3. Cap 27, a single element, appears in both views for orientation.

Figure 4:
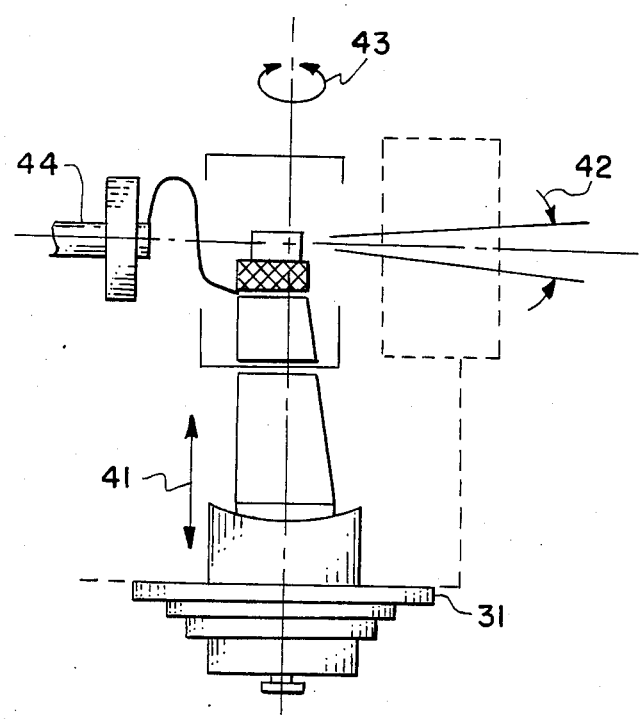
FIG. 4 is a schematic view showing the build up of the adjusting mechanism, transducer mount, cryogenic tip and lens assembly.
Figure 5:
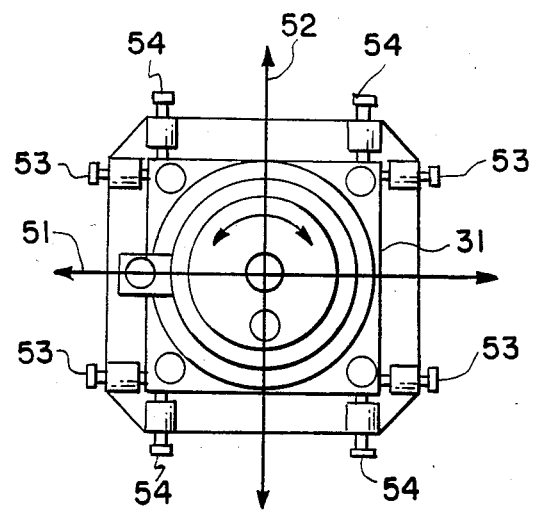
FIG. 5 is a bottom view of the base plate of the adjusting mechanism.

Three parallel adjustment shafts, the pinion axial shaft 11, the pitch shaft 12 and the pinion azimuth shaft 13, are shown in FIG. 3. The additional lateral adjustments, lateral focus and lateral alignment, are body mounted adjustments which provide for linear adjustment of base plate 31 in two directions. Each lateral adjustment consists of two pair of opposed set screws located on opposite sides of base plate 31. The adjustments accomplished by the three parallel shafts are depicted in FIG. 4 by arrows. Also shown in FIG. 4 is the cryogenic cooler cold tip 44 which is more fully described in FIG. 6. Adjustment 41 is performed by adjusting pinion axial shaft 11. Angular adjustment 42 is performed by adjusting pitch shaft 12. Angular adjustment 43 is performed by adjusting pinion azimuth shaft 13. Further adjustments are made by moving base plate 31 laterally. These adjustments are depicted in FIG. 5 by arrows showing lateral focus 51 and lateral alignment 52. Two pairs of set screws 53 on the front and rear of base plate 31 adjust lateral focus. Two pairs of set screws 54 on the sides of base plate 51 adjust lateral alignment.

Figure 6:
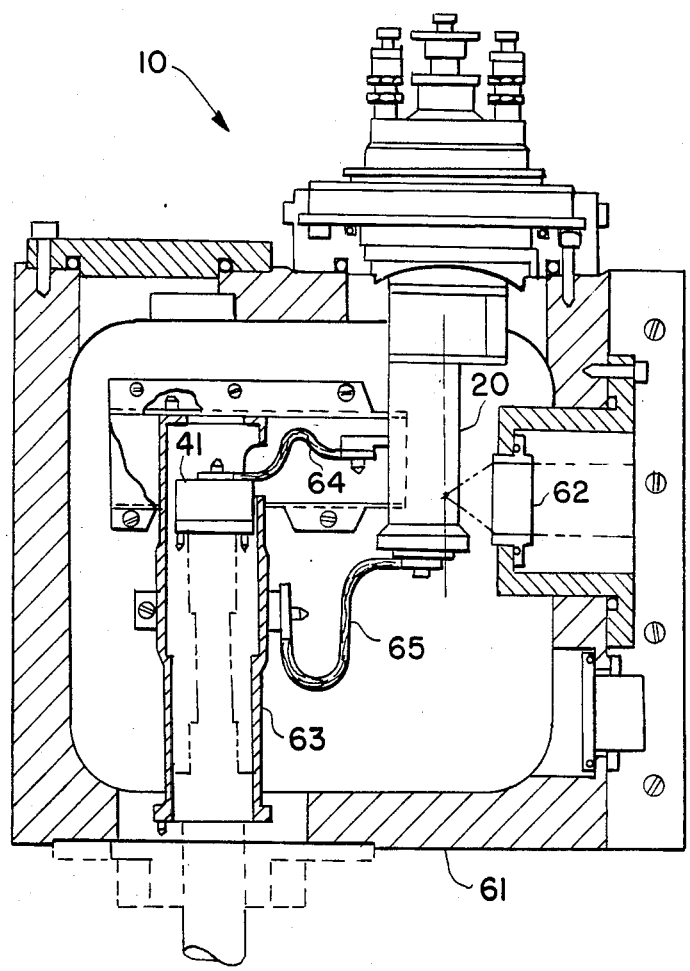
FIG. 6 is a cross-sectional view of the adjusting mechanism, transducer mount, cryogenic tip, lens assembly and flexible thermal straps mounted in the evacuated chamber.

Referring to FIG. 6, the evacuated housing 61, lens assembly 62 and cryogenic cooler radiation shield 63 are shown in cross-section. Cold tip 41 is a cryogenically cooled probe, also shown in FIG. 4 for orientation. The adjusting mechanism 10 and transducer mount 20 are shown mounted to the evacuated housing 61. Also shown in FIG. 6 is a flexible thermal strap 65, which connects the radiation shield 23 and cap 24 (shown in FIG. 2) to the cryogenic cooler radiation shield 63.

OPERATION OF THE INVENTION

Following initial orientation of the base plate so that the reference axis system is typically normal to the instrument mounting plane, lateral adjustments are made in the following manner:

Lateral alignment: (a) Release tension on base plate by "backing out" one pair of lateral (focus) set screws one turn each. This permits the base plate to slide in the lateral (alignment) direction without rotating; (b) "Back out" one pair of lateral (alignment) set screws an identical number of turns, in the desired direction of adjustment. Advance the opposite pair of lateral (alignment) set screws to move the base plate for the desired distance; and (c) Tighten lateral (alignment) set screws and lateral (focus) set screws in pairs to lock base plate in desired location.

Lateral focus: Adjustment similar to above but in opposite order.

As can be seen, when correctly performed, the lateral adjustments can be made independtly of each other and with no effect on the other adjustments. Approximately ±0.10 inches (±2.54 mm) of movement are provided for lateral adjustments.

Axial adjustment: The remaining linear adjustment is accomplished by setting an assembly adjustment. The adjustment is accomplished as follows:

(a) Unlock full system lock by rotating lock nut; (b) Rotate axial pinion lock CCW about one-half turn to relieve shaft seal (not shown); (c) Rotate axial thumb wheel to rotate axial drive pinion 11 which translates axial drive shaft and sector gear drive mount in the axial direction (The transducer mount attaches to the sector gear drive mount.); and (d) When the desired axial adjustment is achieved, tighten lock nut and axial pinion lock to relock the adjusting mechanism. The axial adjustment is accomplished independently of all other adjustments. Approximately ±0.10 inches (±2.54 mm) of axial adjustment is provided.

Pitch angle adjustment: This angular adjustment is used to vary the pitch angle so that the electro optic transducer will have the correct pitch position with respect to the optical axis. The pitch adjustment is accomplished as follows:

(a) Unlock pitch lock by rotating lock sleeve CCW approximately one-eighth turn to free sector gear lock nut and permit pitch angle adjustment; (b) Rotate pitch thumb wheel to rotate pitch shaft 12 which causes miter gear to rotate miter gear pinion causing rotation of sector gear drive mount; and (c) When proper pitch angle is achieved, lock pitch sector gear lock nut by rotating lock sleeve. The pitch angle adjustment is also accomplished independently of all other adjustments. Approximately ±5° of pitch angle adjustment is provided.

Azimuth angle adjustment: This angular adjustment is used to vary the azimuth angle so that the electro optic transducer will have the correct azimuth orientation with respect to the optical axis. The azimuth adjustment is accomplished as follows:

(a) Unlock full system lock by rotating lock nut approximately one-half turn or as necessary to unlock the system; (b) Rotate azimuth pinion lock CCW about one-half turn to relieve shaft seal (not shown); (c) Rotate azimuth thumb wheel to rotate azimuth drive pinion 13 which rotates angular drive gear which rotates angular drive housing and sector gear drive mount; and (d) When proper azimuth angle is achieved, tighten lock nut CW and azimuth pinion lock CW to relock the adjusting mechanism. Azimuth angle adjustment is also accomplished independently of all other adjustments. Approximately ±30° of azimuth angle adjustment is provided.

NOVEL ASPECTS OF THE PRESENT INVENTION

The present invention provides eleven major improvements or new capabilities which have not been previously available. These include: (a) An adjustable mount suitable for positioning an electro-optic transducer with respect to the optical axis of an external optical system; (b) An adjustable mount providing independent adjustment of a mount with five degrees-of-freedom in one mechanism.; (c) An adjustable mount providing attachment to a source of cryogenic cooling for an electro-optic transducer while providing efficient thermal isolation from the ambient environment.; (d) An adjustable mount providing accurate mechanical positioning of an electro-optic transducer in a vacuum environment while permitting external adjustment of said mount in a laboratory environment.; (e) An adjustable mount incorporating a means of locking which permits five degrees-of-freedom adjustment, yet can be locked to provide a rigid structural mount for an electro-optic transducer with respect to an external optical system. (f) An adjustable mount for an electro-optic transducer which can be adjusted during actual system operation thus providing optimum system performance while compensating for operational thermal expansion or vacuum effects. (g) An adjustable mount providing flexible thermal connections to a primary and secondary cryogenic cooling source permitting adjustment of said mount and providing vibration isolation from a cryogenic refrigerator. (h) An adjustable mount which can be adjusted during system operation to compensate for variations in electro-optic transducer performance or to adjust for changes in operating mode or to select alternate modes thus permitting continuous tuning for desired system performance. (i) An adjustable mount incorporating a thermally controlled heat sink which can be configured to accommodate varieties of electro-optic transducers requiring cryogenic cooling and requiring accurate alignment and placement with respect to an arbitrarily defined three-axis coordinate system in space. (j) An adjustable mount utilizing high efficiency rigid fiberglass supports which can be designed and configured to provide a desired level of thermal isolation between a low temperature cryogenic source and a high temperature heat station or an ambient temperature heat sink. (k) An adjustable mount utilizing an enclosed radiation shield attached to a secondary source of cryogenic cooling to guard a primary cold stage from the deleterious effects of parasitic heat loads from neighboring radiative, conductive, and convective heat sources.

Although the invention had been described relative to a specific embodiment thereof, it is not so limited and numerous variations and modifications thereof will be readily apparent to those skilled in the art in the light of the above teaching. For example, the number of side hatches shown in the specification may be increased to allow further variations in configuration. It is therefore to be understood that within the scope of the appended claims the invention may be practiced otherwise than as specifically described.

What is claimed as new and desired to be secured by Letter Patent of the United States is:

1. An adjustable mounting device for mounting an electro-optic transducer in an evacuated, cryogenic chamber and capable of positioning the transducer with respect to an external optical system comprising:

an adjustable base providing linear and angular displacements;

a transducer mount attached to the adjustable base and projecting into a cryogenic chamber;

an insulating means providing thermal isolation of the transducer mount from the adjustable base;

a heat sink attached to the transducer mount by suitable conducting means;

a cryogenic cold source attached to the transducer mount;

an evacuated cryogenic chamber enclosing the transducer mount;

whereby external adjustments in the transducer location and orientation can be made, without disturbing the cryogenic environment, such that the center of rotation of the angular adjustments can be positioned at the focal point of the external optical system.

2. An adjustable mounting device as in claim 1 wherein the adjustable base provides three linear and two angular degrees of freedom.

3. An adjustable mounting device as in claim 1 wherein the adjustable base is sealed to the evacuated container such that accurate mechanical positioning of an electro optic device can be accomplished without disturbing the vacuum environment of the electro optic device.

4. An adjustable mounting device as in claim 1 wherein the adjustable base has independent adjustment such that each degree of freedom may be adjusted and locked independent of any other adjustment.

5. An adjustable mounting device as in claim 1 wherein the adjustable base is fabricated by machining the major components from steel.

6. An adjustable mounting device as in claim 1 wherein the conduction means consists of flexible thermal connections fabricated of high purity copper which permit adjustment of a test sample and provide vibration isolation from the cryogenic refrigerator.

7. An adjustable mounting device as in claim 1 wherein the adjustable base consists of a mechanism using three parallel shafts to provide two angular and one linear adjustments and which achieves two additional linear adjustments by movement of the mechanism base plate and which can be adjusted to co-locate the centers of rotation of the angular adjustments at the focal point of an external optical system.

8. An adjustable mounting device as in claim 1 wherein the transducer mount is constructed of high-efficiency, thermal isolating fiberglass and contains radiation shields to reflect external heat.

9. An adjustable mounting device as in claim 1 wherein the heat sink consists of a mass of high purity copper which can efficiently conduct heat from the test device and a conducting means constructed of high purity copper in the form of a flexible multi-wire strap which can efficiently conduct heat from the sink.

* * * * *